US012583714B2

(12) United States Patent
Venho et al.

(10) Patent No.: US 12,583,714 B2
(45) Date of Patent: Mar. 24, 2026

(54) METHOD FOR CONSTRUCTING AN ELEVATOR ARRANGEMENT AND AN ELEVATOR ARRANGEMENT

(71) Applicant: Kone Corporation, Helsinki (FI)

(72) Inventors: Anssi Venho, Helsinki (FI); Aki Haikonen, Helsinki (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 18/608,042

(22) Filed: Mar. 18, 2024

(65) Prior Publication Data

US 2024/0217779 A1 Jul. 4, 2024

Related U.S. Application Data

(63) Continuation of application No. PCT/EP2021/076361, filed on Sep. 24, 2021.

(51) Int. Cl.
*B66B 19/00* (2006.01)
*B66B 9/00* (2006.01)

(52) U.S. Cl.
CPC ................ *B66B 19/00* (2013.01); *B66B 9/00* (2013.01)

(58) Field of Classification Search
CPC . B66B 19/00; B66B 9/00; B66B 11/00; E04F 17/005
See application file for complete search history.

(56) References Cited

U.S. PATENT DOCUMENTS 3,845,842 A * 11/1974 Johnson .................. B66B 17/12 187/401
3,851,736 A 12/1974 Westlake et al.
(Continued)

FOREIGN PATENT DOCUMENTS

CN 107618959 A 1/2018
EP 0913353 A1 5/1999
(Continued)

OTHER PUBLICATIONS

Machine translation of the description of KR 20140121170 A (Year: 2014).*
(Continued)

*Primary Examiner* — Minh Truong
*Assistant Examiner* — Michelle M Mudwilder
(74) *Attorney, Agent, or Firm* — Harness, Dickey & Pierce, P.L.C.

(57) ABSTRACT

A method for constructing an elevator arrangement and an elevator arrangement. A plurality of preassembled elevator modules are installed in a shaft one above the other to form an elevator module stack, the preassembled elevator modules comprise a top module. A hoist arrangement is provided in the shaft upper area during installation, the hoist arrangement is configured to hoist said preassembled elevator modules; the top module is hoisted inside the shaft by the hoist arrangement; each of the remaining preassembled elevator modules is moved inside the shaft, below a combination of the top module and preassembled elevator modules attached to it from below, said combination of the top module and preassembled elevator modules attached to each other forming the elevator module stack; and each of the remaining preassembled elevator modules is attached to said elevator module stack from below.

17 Claims, 4 Drawing Sheets

(56) References Cited

U.S. PATENT DOCUMENTS

| | | | | |
|---|---|---|---|---|
| 5,012,621 | A * | 5/1991 | Power | E04B 1/34869<br>52/745.03 |
| 7,444,732 | B2 * | 11/2008 | Cruz | B66B 19/002<br>187/408 |
| 8,800,725 | B2 * | 8/2014 | Alois | B66B 19/002<br>29/469 |
| 9,850,653 | B1 * | 12/2017 | Gerard | E04F 17/005 |
| 11,230,837 | B2 * | 1/2022 | Shumate | B28C 7/003 |
| 2024/0017965 | A1 * | 1/2024 | Bellissimo | B66B 5/0087 |
| 2024/0199378 | A1 * | 6/2024 | Bitzi | B66B 19/005 |

FOREIGN PATENT DOCUMENTS

| | | | |
|---|---|---|---|
| EP | 3747820 | A1 | 12/2020 |
| FR | 2964960 | A1 | 3/2012 |
| JP | H08284418 | A * | 10/1996 |
| KR | 20140121170 | A * | 10/2014 |
| KR | 101489287 | B1 * | 2/2015 |

OTHER PUBLICATIONS

Nternational Search Report and Written Opinion issued on Jun. 10, 2022 in PCT/EP2021/076361 filed on Sep. 24, 2021.

* cited by examiner

METHOD FOR CONSTRUCTING AN ELEVATOR ARRANGEMENT AND AN ELEVATOR ARRANGEMENT

CROSS-REFERENCE TO RELATED APPLICATION

This application is a continuation of PCT International Application No. PCT/EP2021/076361 which has an International filing date of Sep. 24, 2021, the entire contents of which are incorporated herein by reference.

FIELD OF THE INVENTION

The invention relates to a method for constructing an elevator arrangement and an elevator arrangement. The elevator is preferably an elevator for transporting passengers and/or goods.

BACKGROUND OF THE INVENTION

Conventionally, elevators have been built from components into a prefabricated hoistway or a hoistway is fabricated concurrently with the other parts of the elevator. A drawback has been that all elevator installation work taking place at the construction site consumes time and complicates logistics of the construction site. A drawback has also been that accurate positioning of components has required lots of adjustment at the site. Also, modular elevator solutions have been used, where an elevator is built from several modules.

Modular construction business is increasing trend worldwide and elevator manufacturers need to respond to it. The reason for this is the shorter construction time. Using traditional construction methods, it can take about a week to build an elevator one floor high vertically inside a building. With traditional elevator installation method, the elevator manufactures are the bottle neck in construction process slowing down the total through put time.

In many cases the module-based elevator can be hoisted to building module by module from top. Related prior solutions have been disclosed in documents EP 0 913 353 A1 and EP 3 747 820 A1, for instance. These documents disclose modular solutions, where an elevator is partly built from several prefabricated modules.

SUMMARY OF THE INVENTION

The object of the invention is to introduce an improved method for constructing an elevator arrangement and an elevator arrangement. An object is to introduce a solution by which one or more of the above defined problems of prior art and/or drawbacks discussed or implied elsewhere in the description can be solved. An object is particularly to provide a solution with improved safety and ergonomics at work. In particular, an object is to provide a solution for the construction of an elevator when a construction site top crane cannot be used.

It is brought forward a new method for constructing an elevator arrangement, comprising:

providing a plurality of preassembled elevator modules to be installed in a shaft one above the other to form an elevator module stack, the preassembled elevator modules comprise a top module; the method further comprising:

providing a hoist arrangement in the shaft upper area, the hoist arrangement is configured to hoist said preassembled elevator modules;

moving the top module inside the shaft to be hoisted by the hoist arrangement;

moving each of the remaining preassembled elevator modules inside the shaft, below a combination of the top module and preassembled elevator modules attached to it from below, said combination of the top module and preassembled elevator modules attached to each other forming the elevator module stack; and attaching each of the remaining preassembled elevator modules to said elevator module stack from below.

It is also brought forward a new elevator arrangement, comprising:

a plurality of preassembled elevator modules arranged in a shaft one above the other to form an elevator module stack, the preassembled elevator modules comprise a top module; the arrangement further comprising:

a hoist arrangement provided in the shaft upper area during an installation state of the elevator arrangement, the hoist arrangement is configured to hoist said preassembled elevator modules;

the elevator module stack is configured to be formed by attaching a preassembled elevator module from below to the top module hoisted by the hoist arrangement to form a combination of the top module and the preassembled elevator module attached to it from below; and further the elevator module stack is configured to be formed by attaching each of the remaining preassembled elevator modules to said elevator module stack from below.

The invention enables the module-based elevator to be transferred and constructed into a shaft, module by module, from the bottom up. Thus, in case top craning is not possible or the construction site crane is mainly reserved for other purposes, the modules can be brought into the shaft from the bottom. Installing the elevator may be implemented and the elevator arrangement can be constructed while the shaft and the elevator components are protected from the weather, reducing the risk of damage caused by the weather. The modular method and modular arrangement can speed up the construction of a single floor to as little as one day.

Preferable further details of the invention are introduced in the following, which further details can be combined individually or in any combination.

According to an embodiment a compensation module is moved inside the shaft below the top module. According to an embodiment the compensation module is attached to the top module from below to form the elevator module stack.

According to an embodiment an intermediate module is moved inside the shaft below said elevator module stack. According to an embodiment the intermediate module is attached to said elevator module stack from below.

According to an embodiment an intermediate module is moved inside the shaft below said elevator module stack. According to an embodiment the intermediate module is attached to the compensation module from below.

According to an embodiment a plurality of compensation modules and intermediate modules are moved alternately inside the shaft below the elevator module stack. According to an embodiment compensation modules and intermediate modules are attached in turn to the module stack from below, preferably until a last intermediate module is fixed to the stack from below.

According to an embodiment a last compensation module is moved inside the shaft below the elevator module stack. According to an embodiment said last compensation module is attached to an upper last intermediate module and to a lower pit module.

According to an embodiment, after the last preassembled elevator module is attached to the elevator stack, an elevator car comprised by one of the intermediate modules is hoisted by the hoist arrangement so that the car no longer needs to be supported by the hoist arrangement. According to an embodiment, after the last preassembled elevator module is attached to the elevator stack, rail and door lines are aligned and finetuned, a modular shaft electrification is connected, a hoisting roping is installed, an elevator travelling cable is installed, so that the car no longer needs to be supported by the hoist arrangement.

According to an embodiment the preassembled elevator modules comprise a pit module.

According to an embodiment the pit module is moved inside the shaft below the hoist arrangement and the top module.

According to an embodiment the pit module is moved into the shaft as the first module of the module stack to be formed from bottom up. According to an embodiment the pit module is lowered into its intended location at the bottom of a pit comprised by the shaft.

According to an embodiment a ramp arrangement is installed during installation phase of the elevator arrangement into the shaft above the pit module. According to an embodiment the ramp arrangement is supported by the pit module for assisting transfer of the preassembled elevator modules into the shaft.

According to an embodiment the top module comprises a machinery for driving a hoisting roping. According to an embodiment the top module comprises one or more car guide rail sections.

According to an embodiment the machinery for driving the hoisting roping is mounted on a car guide rail section of the preassembled top module to be vertically carried by the car guide rail section.

According to an embodiment each preassembled module comprises a frame which forms the bearing structure of the module in question.

According to an embodiment each preassembled module comprises one or more guide rail sections, wherein each guide rail section is preferably fixed on the frame with at least one fixing bracket.

According to an embodiment the hoist arrangement comprises a hoist diverter rotatably fixed at upper area of the shaft, the hoist ropes are installed around the hoist diverter and support a hoist is equipped with a bottom hoisting gripper.

According to an embodiment the preassembled elevator modules comprise a compensation module, which is designed to compensate the floor thickness dimension lost between two adjacent intermediate modules.

According to an embodiment the compensation module comprises compensation rail sections to be attached to upper rail sections comprised by the adjacent upper preassembled module and to the lower rail sections comprised by the adjacent lower preassembled module.

According to an embodiment the preassembled elevator modules comprise a plurality of intermediate modules with preassembled elevator rails and elevator doors.

According to an embodiment the preassembled elevator modules comprise one intermediate module with preassembled elevator car.

According to an embodiment the preassembled elevator modules comprise a last intermediate module with preassembled elevator car.

Compared to traditional installation the installation safety is improved due to reduced time working on heights. Both the quality of achieved elevator arrangement and quality of the working environment is improved as the modules are made in controlled workshop with factory level quality controlling procedures. In addition, the installation and material costs of the elevator arrangement will be decreased due to factory environment with proper tools for hoisting, logistics, power tools, proper planning, and proper work force time control. Installation time can be saved, and earlier commissioning of an elevator can be achieved. Further with the invention working ergonomics can be enhanced.

Compared to prior art top-down type of module installation this innovation is enabling bottom-up type elevator installation enlarging the availability of elevator deliveries to retrofit and renovation projects. Usually in retrofit and renovation projects there is a roof construction of a building above the elevator shaft. Preferably said roof construction can be held intact in place, thus providing weather protection. In addition, stacking from the bottom avoids the need for a space consuming site crane on the construction site. In addition, smaller volumes of the modules are lighter making the maneuvering operation easier, safer, and cheaper. The site crane, if available at all, and typically difficult to get into use, is not needed.

BRIEF DESCRIPTION OF THE DRAWINGS

In the following the present invention will be described in closer detail by means of preferred embodiments with reference to the attached drawings, in which.

DETAILED DESCRIPTION

Figure 1:
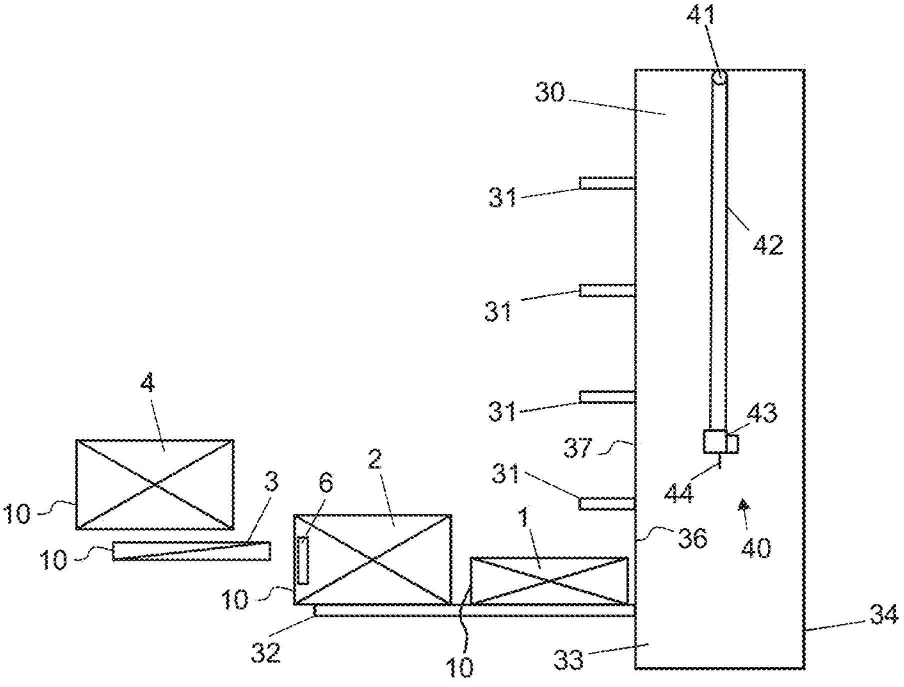
FIG. 1 illustrates schematically an initial situation in an elevator shaft before installation of elevator modules.
Figure 4:
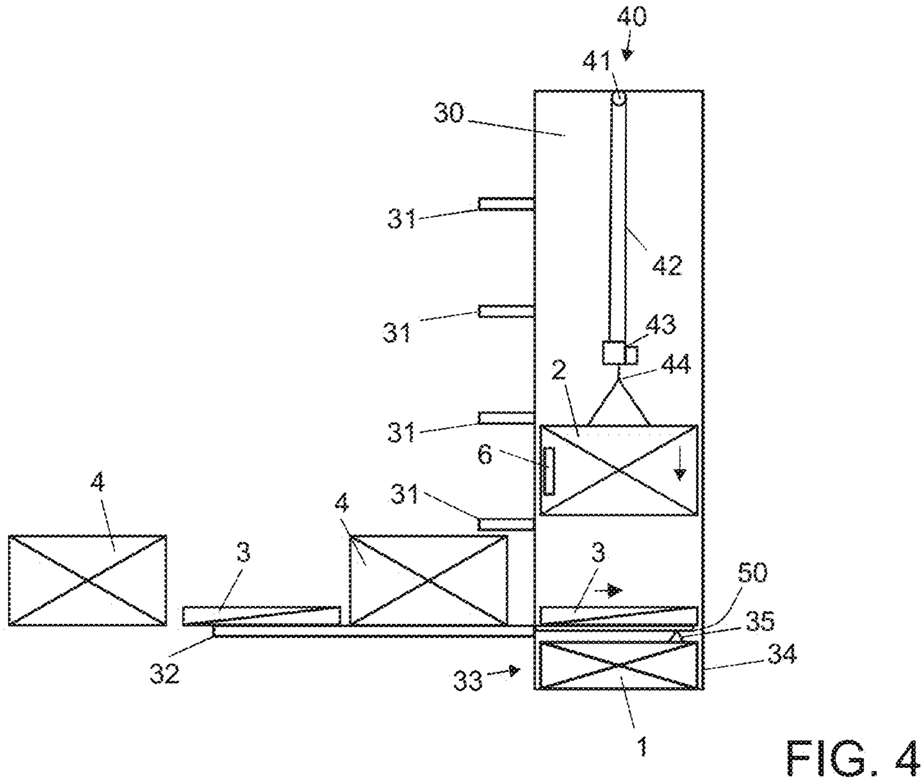
FIG. 4 illustrates moving of the top module and a first compensation module.
Figure 5:
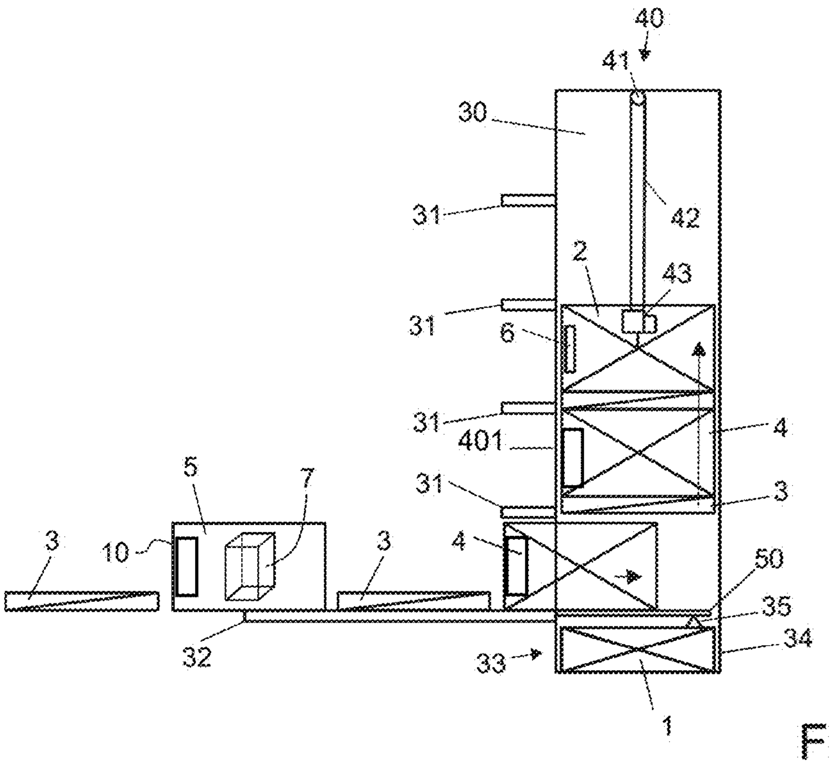
FIG. 5 illustrates repeated alternating attaching of compensation and intermediate modules to the bottom of a module stack.
Figure 6:
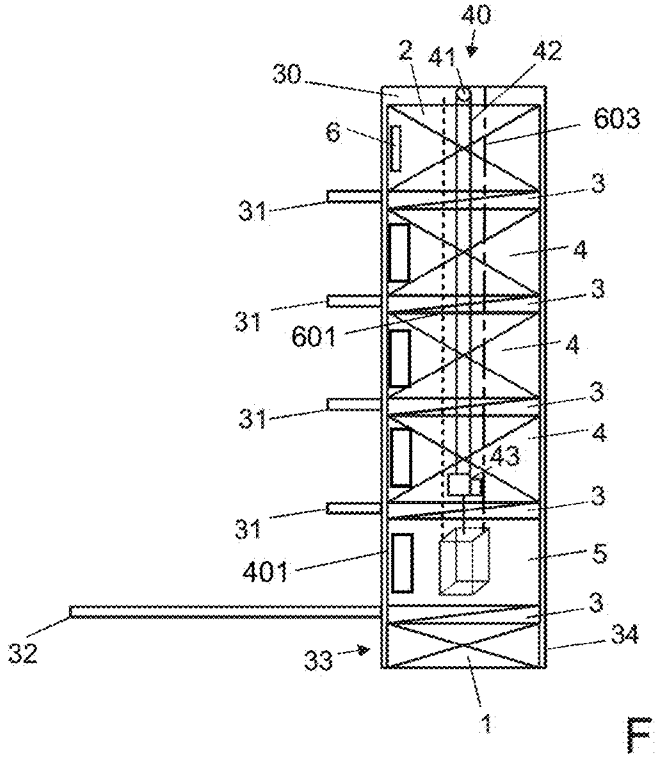
FIG. 6 illustrates the method in a final stage of the elevator arrangement.

FIGS. 1-6 illustrate an elevator arrangement construction method on the construction site. FIG. 1 shows the initial situation in an elevator shaft 30 before the delivery of a plurality of elevator modules 1, 2, 3, 4 and 5 into the shaft. FIGS. 2-5 show the progress of the bottom-up type installation and FIG. 6 shows a resulting elevator arrangement within a building achieved by the elevator construction method.

The elevator modules 1, 2, 3, 4 and 5 are manufactured and preassembled off site in workshop before delivery to the construction site. The elevator modules comprise a pit module 1, a top module 2, a plurality of compensation modules 3, a plurality of first intermediate modules 4 and a last intermediate module 5. The height of one intermediate module 4, 5 is approximately the height of one floor or the open distance between two landings 31 of the building.

Preferably the prefabricated and preassembled elevator modules 1, 2, 3, 4 and 5 comprise a frame 10 which forms the bearing structure of the module in question. Said frame 10 is forming a continuous vertically elongated hoistway where an elevator car 7 can be fitted to move along car guide rails in a completely assembled state of the preassembled elevator modules. Said frame 10 may be tubular. In order to form a uniform stack of modules, preferably the preassembled elevator modules 1, 2, 3, 4 and 5 are fixedly attached to each other using bolts or pins or similar fastening methods.

Preferably the top module 2 comprises a machinery 6 for driving a hoisting roping, and one or more car guide rail sections. Preferably the machinery 6 for driving the hoisting roping is mounted on a car guide rail section of the preassembled top module to be vertically carried by the car guide rail section.

Each of the top module, compensation modules and intermediate modules comprise one or more car guide rail sections 8 for forming the complete car guide rail arrangement when fixed to each other and the installation of the elevator is finished. Preferably each car guide rail section is fixed on the frame 10 with at least one fixing bracket.

The car guide rail sections 8 have been positioned in the preassembled modules such that when the modules are stacked, the car guide rail sections become vertically aligned forming one or more continuous vertical guide rail lines for guiding the elevator car 7.

The method comprises providing a counterweight, and preferably each preassembled module comprises one or more counterweight guide rail sections (not shown in Figures), wherein each said counterweight guide rail section is preferably fixed on the frame 10 with at least one fixing bracket.

Preferably the counterweight guide rail sections have been positioned in the modules such that when the modules have been stacked, the counterweight guide rail sections become vertically aligned forming one or more continuous vertical guide rail lines for guiding the counterweight.

The modules are delivered to the construction site with normal truck transport and unloaded to vertical position. The vertical modules are brought inside the building to a loading floor, such as the lowest floor or a lowest landing 32, to await their turn to be transferred horizontally to the shaft, for instance through a shaft opening 36, i.e., a door opening to the elevator shaft 30. Preferably the modules are delivered to site in right order in order to speed up the installation and to make construction site logistics smooth. Optionally, the upper floors or upper floor landings 31 are also possible waiting areas and optionally at least one of the modules may be moved into the shaft below the hoist arrangement 40 through an upper floor shaft opening 37.

Preferably the installation is started arranging a hoist arrangement 40 such as a man riding hoist at the top area of the shaft 30, as shown in FIG. 1. The hoist arrangement 40 comprises a hoist diverter 41 rotatably fixed at the top area of the shaft. Hoist ropes 42 are installed around the hoist diverter preferably to a conventional 2:1 reeving. The ropes 42 support a hoist 43 equipped with a bottom hoisting gripper 44 such as a hook. The hoist 43 is able to move the rope 42 and the hoist arrangement 40 is able to carry the weight of a stack of elevator modules 2, 3, 4, 5 extending from the bottom. Advantageously the hoist arrangement 40 is available for hoisting all time as the elevator installation progresses. Thus, the hoisting capacity does not create a bottleneck situation, as in many cases on construction sites where a construction crane is used to install the elevator.

Figure 2:
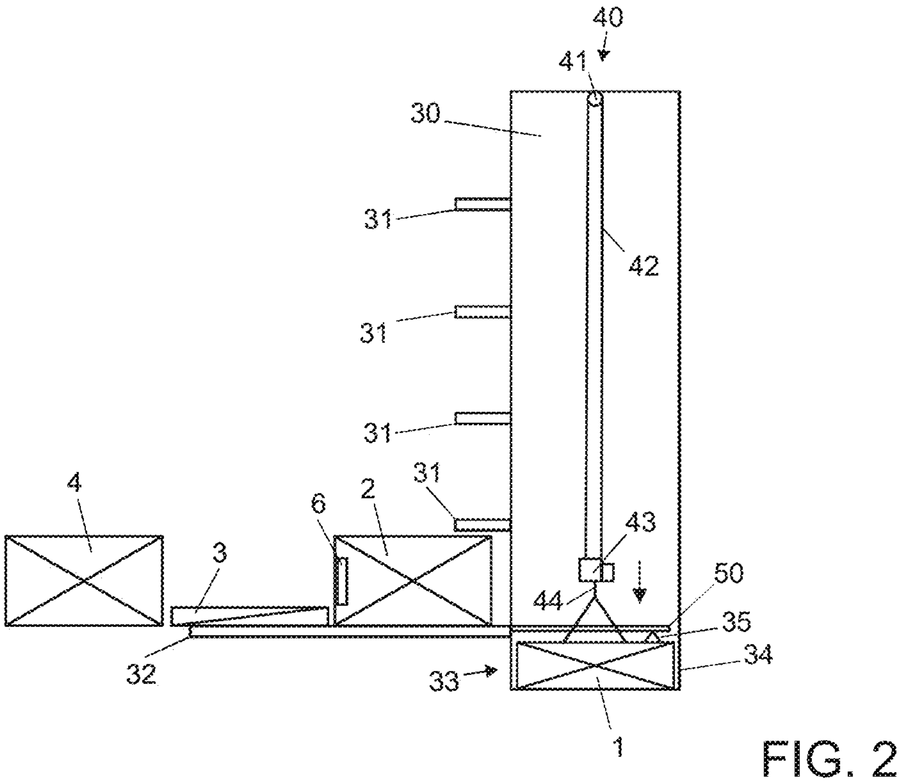
FIG. 2 illustrates moving of a pit module.

In FIG. 2, the pit module 1, preferably with a height corresponding to the pit 33, is moved and hoisted into the shaft 30 below the hoist arrangement 40. According to some embodiments the pit module 1 is transferred into the shaft 30 as the first module of the module stack to be formed from bottom up and lowered into its intended location at the bottom of the pit 33. One fact in favour of the moving the pit module as first module into its intended position, is that transfer arrangements for the following modules to be pushed into the shaft can be supported 35 on the pit module. Preferably a ramp arrangement 50 is installed from the bottom landing 32 and directed to a shaft back wall 34 and supported 35 by the pit module 1. Moving the elevator modules from outside to inside the shaft can, of course, also be implemented by another assisted transfer arrangement.

Figure 3:
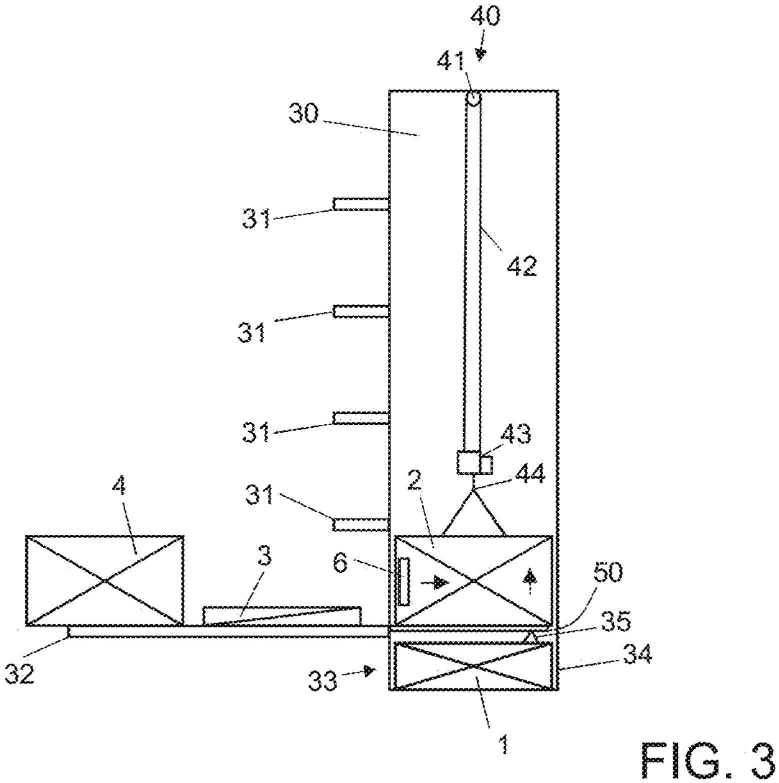
FIG. 3 illustrates moving of a top module.

In FIG. 3, as the second module moved into the shaft 30, the top module 2 completely preassembled with rails, machinery 6, rope hitches, drive, overspeed governor etc. will be moved on the ramp arrangement 50 into the shaft. The hoist 43 is attached to the top module 2 and next the top module is hoisted up to provide space for moving in of the first compensation module 3.

In FIG. 4, the compensation module 3 is transferred into the shaft 30. In the following, the top module 2 is lowered by the hoist arrangement 40 onto the compensation module and fixedly attached it to using bolts or pins or similar fastening methods. Next the combination of the top module 2 and the compensation module 3 is hoisted upwards as high as needed to move in the next full height module.

Next the first of all first intermediate modules 4, where all the components are preassembled, i.e., the rails and doors 401 are in place, is moved inside the shaft 30. The combination of previous modules, in other words the top module 2 and the compensation module 3 of FIG. 4, is lowered on top of that first intermediate module 4 and attached to it.

FIG. 5 shows how following steps are then repeated: hoisting the stack of modules 2, 3, 4, attached to each other upwards (to make space for the next module to be moved into the shaft 30), moving the next module (compensation modules and first intermediate alternately) inside the shaft, lowering the stack of modules onto that module, attaching the lower module transferred into the shaft to the upper module stack.

According to some embodiments the top module 2 is transferred as the first module of the module stack to be formed from bottom up. Thereafter, the top module is hoisted upwards in order to provide space for moving in of next modules to be attached in turn, first to the bottom of top module 2, and next to the bottom of the elevator module stack to be formed alternately of compensation modules 3 and intermediate modules 4, and finally of the last intermediate module 5.

The operation described above continues until the last intermediate module 5 with the preassembled elevator car 7 and counterweight frame is hoisted upwards. Thereafter the ramp arrangement 50 is removed and the last of all compensation modules 3 is moved in and fixed onto the pit module 1. Next, a fixed connection is established between the last intermediate module 5 and the last compensation module 3 after the upper module stack has been lowered onto the pit module.

Figure 8:
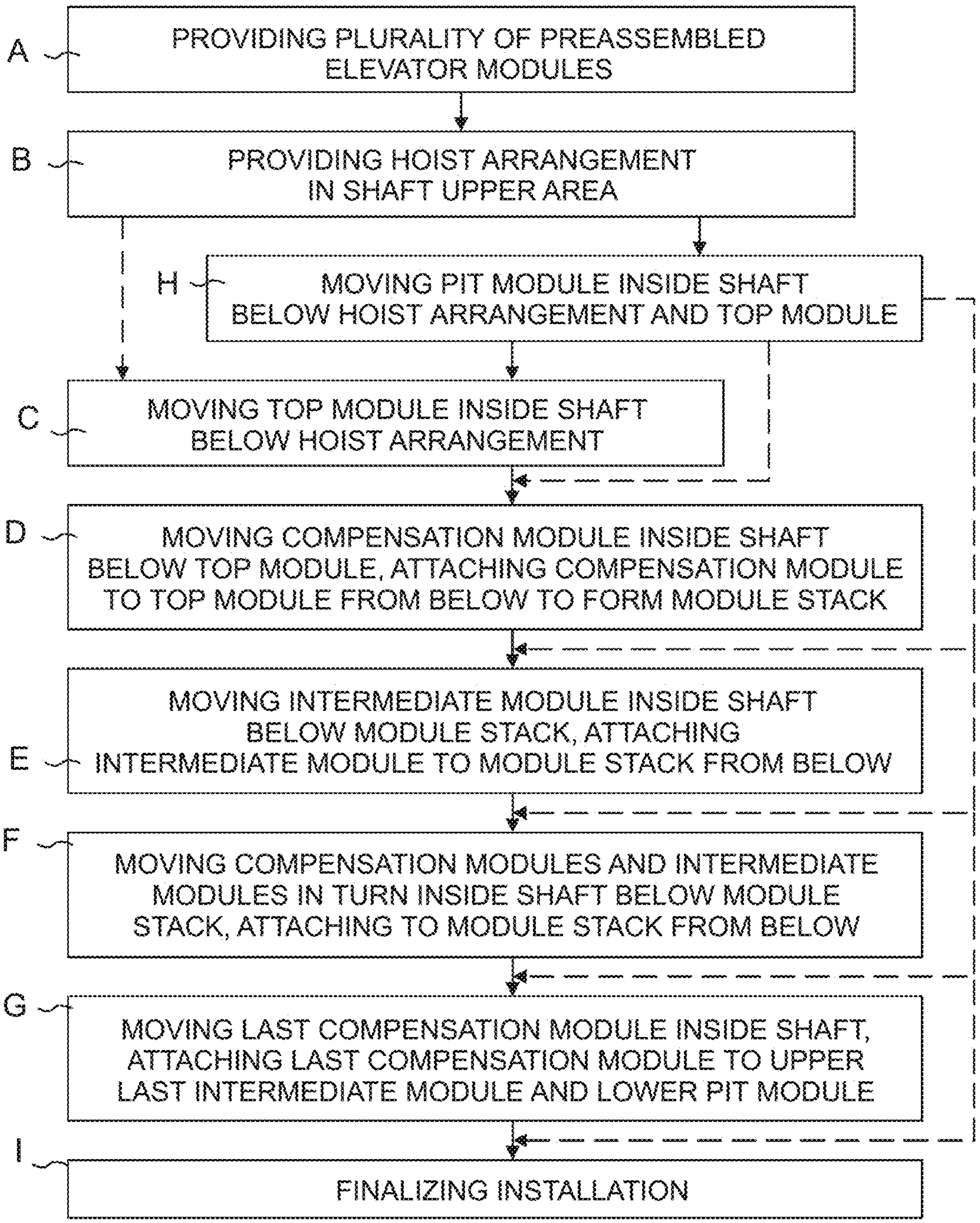
FIG. 8 is a flow diagram of a method that can be implemented in the elevator arrangement installation of FIGS. 1-6.

The pit module 1 does not necessarily need to be moved into the shaft 30 as the first module. The pit module 1 can also be moved into the shaft after the top module 2 as shown in FIG. 8. The pit module 1 may be lowered into the pit 33 using the upper top module 2 supported by the hoist 43 or the upper module stack supported by the hoist 43.

FIG. 6 shows the final stage of the elevator installation, where all modules are installed and fixed firmly, e.g., bolted together to form a stack of elevator modules. The modules are fixedly attached in relation to the shaft 30 and the hoist 43 can be disconnected from the modules.

Once the last compensation module 3 is attached to the last intermediate module 5 above and to the pit module 1, the installation is continued by lowering the hoist 43 and attaching it to the elevator car 7. The installation is finalized by aligning and finetuning the rail and door lines, connecting the modular shaft electrification (shaft bundle), installing hoisting roping 601, installing elevator travelling cable 603, etc. so that the car 7 no longer needs to be supported by the hoist 43, removing the hoist arrangement 40, and finally commissioning and inspecting the elevator to public use.

Figure 7:
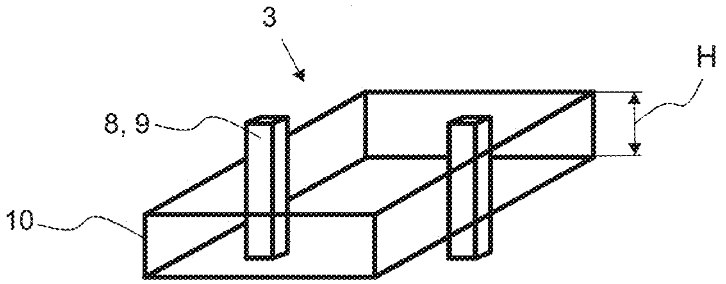
FIG. 7 illustrates a compensation module.

FIG. 7 illustrates the compensation module 3, which is designed to compensate the floor thickness dimension H lost between two adjacent intermediate modules. The compensation module 3 enables the modules to be transported vertically and positioned vertically at the right height in relation to each other. Thus, for example, the vertical height of an elevator door will be aligned at the same height as the door opening of the floor in question. The compensation module 3 comprises compensation rail sections to be attached to the upper rail sections comprised by the adjacent upper module and to the lower rail sections comprised by the adjacent lower module. Preferably there are provided guide rail sections 8 and rail connection components 9 for the car guide rails, and counterweight rail sections (not shown in Figures) for the counterweight rails. Preferably the rail connection components are preassembled in the rail sections. Preferably the rail sections are combined with relevant rail connection components such as fish plates 9. An example of the vertical height of the compensation module 3 is the combination of the height of the floor thickness H and the height of the connected fish plates 9, i.e., 600 mm.

FIG. 8 is an example flow diagram of a method that can be implemented in the elevator arrangement installation described in FIGS. 1-6.

In step A a plurality of elevator modules 1, 2, 3, 4 and 5 are manufactured and preassembled off site in workshop before delivery to the construction site. The plurality elevator of modules comprises a pit module 1, a top module 2, a plurality of compensation modules 3, a plurality of first intermediate modules 4 and a last intermediate module 5.

In step B a hoist arrangement 40 such as a man riding hoist is installed at the top or upper area of the shaft 30 as described above and shown in FIG. 1. The hoist arrangement 40 is used in the following steps to hoist the modules 1, 2, 3, 4, 5 and the elevator car 7 upwards and downwards.

In step C the top module 2 is moved inside the shaft 30 below the hoist arrangement 40 preferably as the uppermost preassembled module of the elevator module stack to be formed of the preassembled elevator modules 1, 2, 3, 4 and 5 from the bottom up.

In step D the compensation module 3 is moved inside the shaft 30 below the top module 2. The compensation module is attached to the top module from below to start forming the elevator module stack 2, 3.

In step E the intermediate module 4 is moved inside the shaft 30 below the elevator module stack 2, 3. The intermediate module is attached to the module stack 2, 3 from below to continue forming the elevator module stack 2, 3, 4.

In step F a plurality of compensation modules 3 and intermediate modules 4 are alternately moved inside the shaft 30 below the elevator module stack 2, 3, 4 and attached in turn to the module stack 2, 3, 4 from below until the last intermediate module 5 is fixed to the stack from below.

In step G the last compensation module 3 is moved inside the shaft 30 below the elevator module stack 2, 3, 4, 5 and attached to the upper last intermediate module 5 and to the lower pit module 1.

In step H the pit module 1 is moved inside the shaft 30 below the hoist arrangement 40 and top module 2. In some embodiments the pit module 1 is transferred as the first module inside the shaft and to its intended destination in the pit 33 as described above and shown in FIG. 8 by the solid arrows relating to step H. In some other embodiments the pit module 1 may also be moved into the pit 33 at various stages of the installation after the top module has been moved inside the shaft, as shown in FIG. 8 by the dashed arrows relating to step H.

In step I the installation may be continued by attaching the hoist 43 to the elevator car 7. The installation is finalized by aligning and finetuning the rail and door lines, connecting the modular shaft electrification, installing hoisting roping, installing elevator travelling cable, etc. so that the car 7 no longer needs to be supported by the hoist 43, removing the hoist arrangement 40, and finally commissioning and inspecting the elevator to public use.

In the application, several details have been presented as preferred. This means that they are preferred, however they are not to be understood as necessary, because it may be that the arrangement can be implemented also without them.

It is to be understood that the above description and the accompanying figures are only intended to illustrate the present invention. It will be obvious to a person skilled in the art that the invention can be varied and modified without departing from the scope of the invention.

The invention claimed is:

1. A method for constructing an elevator arrangement, comprising:

providing preassembled elevator modules to be installed in a shaft one above another to form an elevator module stack, the preassembled elevator modules comprise a top module, compensation modules, and intermediate modules;

providing a hoist arrangement fixed to an upper surface in the shaft above a lowest landing in the shaft, the hoist arrangement is configured to hoist said preassembled elevator modules towards the upper surface;

moving the top module inside the shaft to be hoisted by the hoist arrangement;

moving and attaching the compensation modules and the intermediate modules alternately inside the shaft below the top module to form the elevator module stack the intermediate modules including elevator doors fitting door openings of the shaft, the compensation modules are different from the intermediate modules and being sized to fit a landing floor thickness of the shaft such that the elevator doors of adjacent ones of the intermediate modules align to a respective one of the door openings of the shaft; and attaching each of remaining ones of the preassembled elevator modules to said elevator module stack from below.

2. The method according to claim 1, further comprising initially moving a compensation module inside the shaft below the top module and attaching the compensation module to the top module from below to form the elevator module stack.

3. The method according to claim 1, further comprising moving a last one of the compensation modules inside the shaft below the elevator module stack and attaching said last one of the compensation modules to an upper last one of the intermediate modules and to a lower pit module.

4. The method according to claim 3, further comprising, after attaching the last one of compensation modules to the elevator module stack, hoisting by the hoist arrangement an elevator car included in one of the intermediate modules, aligning and finetuning rail and door lines, connecting modular shaft electrification, installing hoisting roping, installing elevator travelling cable, so that the elevator car no longer needs to be supported by the hoist arrangement.

5. The method according to claim 1, wherein the preassembled elevator modules comprise a pit module, wherein the method further comprises:

moving the pit module inside the shaft below the hoist arrangement and the top module, and/or moving the pit module into the shaft as a first module of the elevator module stack to be formed from bottom up and lowering the pit module into its intended location at the bottom of a pit comprised by the shaft, and/or installing a ramp arrangement into the shaft above the pit module and supported by the pit module for assisting transfer of the preassembled elevator modules into the shaft.

6. The method according to claim 1, wherein the compensation modules include compensation rail sections to be attached to upper rail sections comprised by an upper adjacent one of the intermediate modules and to lower rail sections comprised by a lower adjacent one of the intermediate modules.

7. The method according to claim 1, wherein the top module comprises a machinery for driving a hoisting roping, and the top module comprises one or more car guide rail sections, and the machinery for driving the hoisting roping is mounted on a car guide rail section of the top module to be vertically carried by the car guide rail section.

8. The method according to claim 1, wherein the intermediate modules include preassembled elevator rails.

9. The method according to claim 1, wherein one of the intermediate modules includes a preassembled elevator car.

10. An elevator arrangement, comprising:

preassembled elevator modules arranged in a shaft one above the another to form an elevator module stack, the preassembled elevator modules comprise a top module, compensation modules, and intermediate modules, the compensation modules and the intermediate modules alternatively arranged below the top module;

a hoist arrangement fixed to an upper surface in the shaft above a lowest landing in the shaft during an installation state of the elevator arrangement, the hoist arrangement is configured to hoist said preassembled elevator modules towards the upper surface;

the elevator module stack configured to be formed by attaching a preassembled elevator module from below to the top module hoisted by the hoist arrangement to form a combination of the top module and the preassembled elevator module attached to it from below, the intermediate modules including elevator doors fitting door openings of the shaft, the compensation modules are different from the intermediate modules and being sized to fit a landing floor thickness of the shaft such that the elevator doors of adjacent ones of the intermediate modules align to a respective one of the door openings of the shaft; and the elevator module stack configured to be formed by attaching each of remaining ones of the preassembled elevator modules to said elevator module stack from below.

11. The elevator arrangement according to claim 10, wherein the compensation modules further include compensation rail sections to be attached to upper rail sections comprised by an upper adjacent one of the intermediate modules and to lower rail sections comprised by a lower adjacent one of the intermediate modules.

12. The elevator arrangement according to claim 10, wherein the top module comprises a machinery for driving a hoisting roping, and the top module comprises one or more car guide rail sections, and the machinery for driving the hoisting roping is mounted on a car guide rail section of the top module to be vertically carried by the car guide rail section.

13. The elevator arrangement according to claim 10, wherein the intermediate modules further include preassembled elevator rails.

14. The elevator arrangement according to claim 10, wherein one of the intermediate modules include preassembled elevator car.

15. The elevator arrangement according to claim 10, wherein one of the compensation modules is attached to a bottom of the top module.

16. The elevator arrangement according to claim 10, wherein each preassembled elevator module comprises a frame which forms a bearing structure of the preassembled elevator module in question.

17. The elevator arrangement according to claim 16, wherein each preassembled module comprises one or more guide rail sections, and each guide rail section is fixed on the frame with at least one fixing bracket.

* * * * *